United States Patent [19]

Brown, Jr. et al.

[11] 4,006,372
[45] Feb. 1, 1977

[54] TRANSDUCER POSITIONER

[75] Inventors: Leon Henry Brown, Jr., Sylmar; David H. Peters, Santa Monica, both of Calif.

[73] Assignee: Wangco Incorporated, Los Angeles, Calif.

[22] Filed: Mar. 10, 1975

[21] Appl. No.: 557,109

[52] U.S. Cl. .................................. 310/13; 310/27
[51] Int. Cl.[2] ...................................... H02K 41/02
[58] Field of Search ........................... 310/12–14, 310/27

[56] References Cited

UNITED STATES PATENTS

| | | | |
|---|---|---|---|
| 3,521,092 | 7/1970 | Kalthoff | 310/27 X |
| 3,577,023 | 5/1971 | Bleiman | 310/27 X |
| 3,586,891 | 6/1971 | Applequist et al. | 310/27 X |
| 3,656,015 | 4/1972 | Gillum | 310/13 |
| 3,666,977 | 5/1972 | Helms et al. | 310/13 |
| 3,694,678 | 9/1972 | Scarrott | 310/13 |
| 3,735,163 | 5/1973 | Dijksdra et al. | 310/13 |
| 3,743,870 | 7/1973 | Hunt | 310/13 |
| 3,760,206 | 9/1973 | Hertrich | 310/13 |
| 3,889,139 | 6/1975 | Hughes | 310/13 |
| 3,899,699 | 8/1975 | Griffing | 310/13 |

Primary Examiner—Donovan F. Duggan
Attorney, Agent, or Firm—Henry M. Bissell

[57] ABSTRACT

Positioning apparatus for moving read-write transducers in data record systems achieves improved stability in the motion and positioning of such transducers with reduced complexity of structure compared with known apparatus of the prior art. A particular structure, including a female dovetail guide surface and a plurality of cooperating sloped guide wheels, one of which is spring-loaded for force balancing, causes a plurality of reference guide wheels to maintain firm and stable contact with a smooth and flat reference surface and assures the desired stable and accurate movement of the carriage.

16 Claims, 5 Drawing Figures

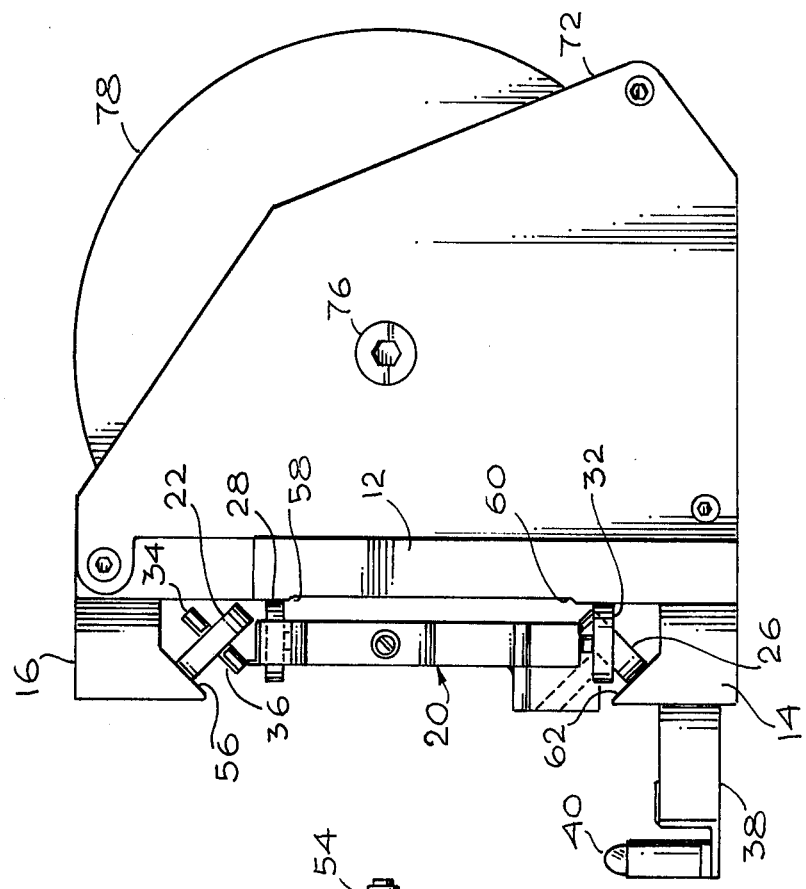
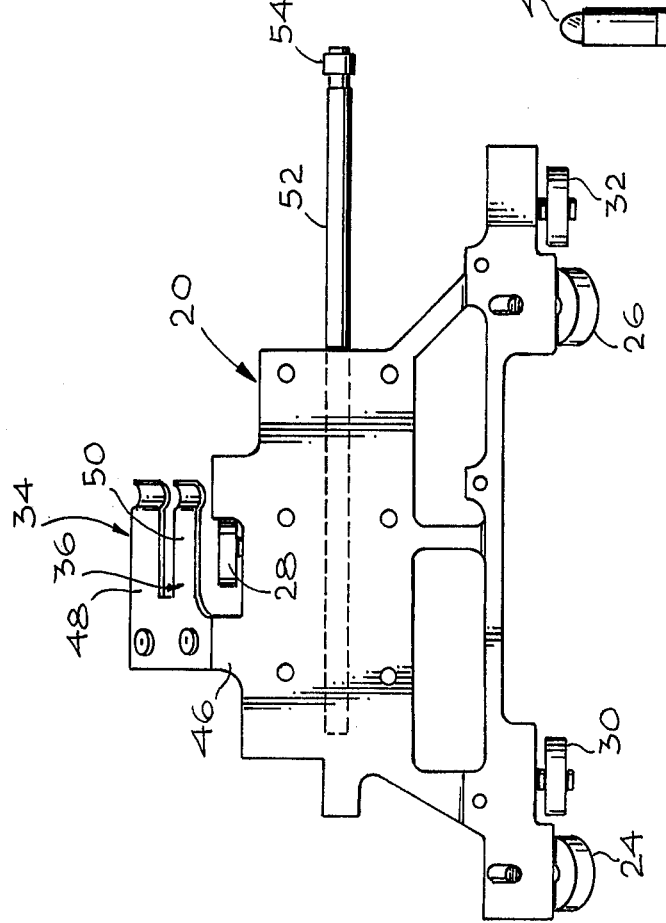

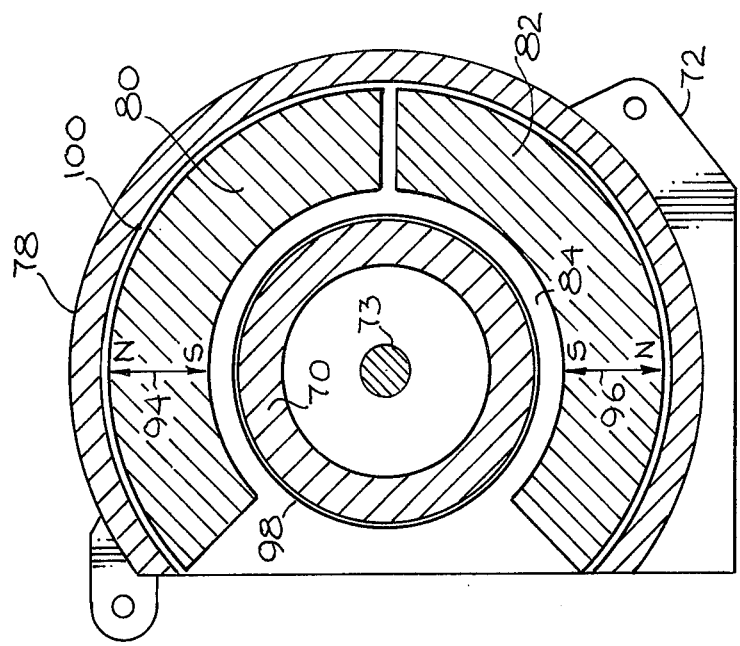
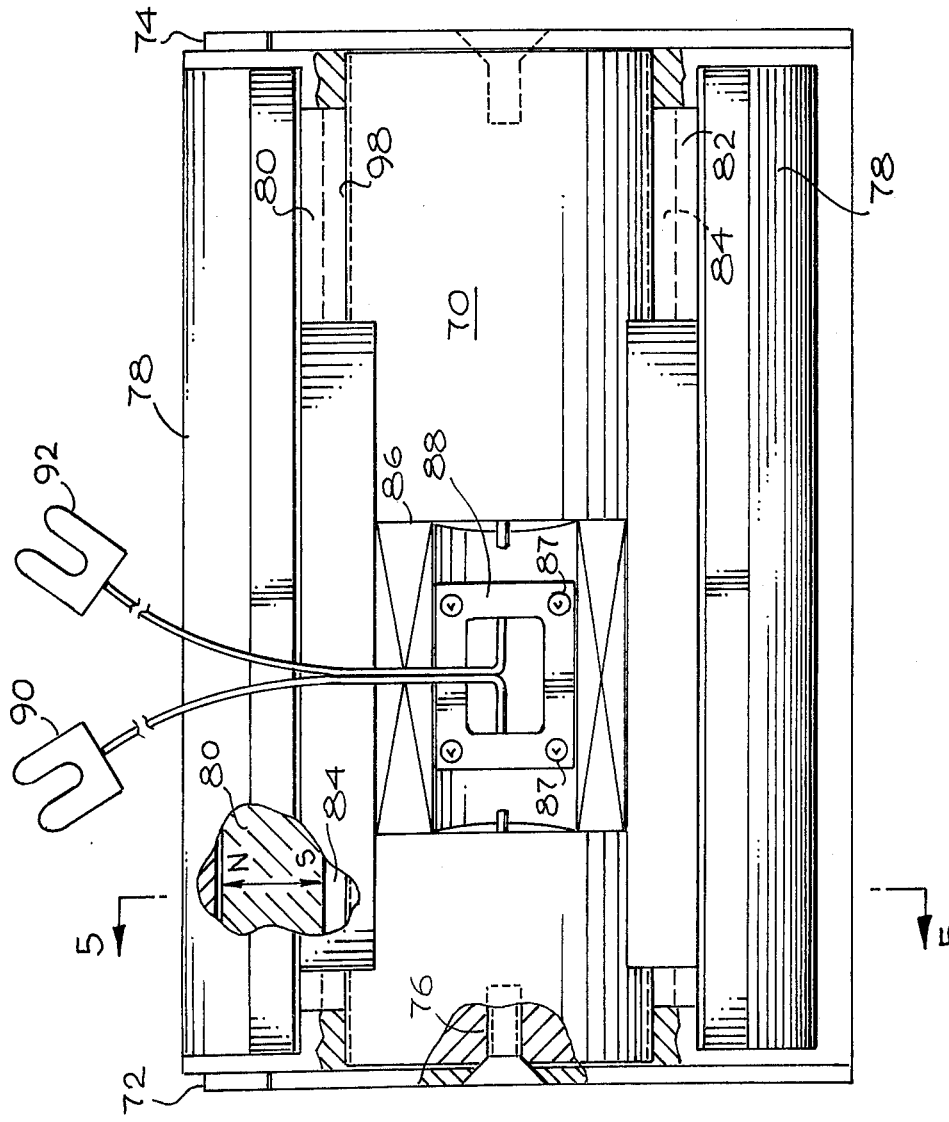
Fig. 5
Fig. 4

TRANSDUCER POSITIONER

BACKGROUND OF THE INVENTION

1. Field of the Invention

This invention relates to data recording apparatus and, more particularly, to such apparatus capable of accurate and reproducible positioning of the read-write transducers incorporated in such apparatus.

2. Description of the Prior Art

Magnetic recording is a common method for storing both analog and digital information or data. Today, in the digital field particularly, recording of data on the surfaces of magnetic discs is a widely-used technique. The recording and playback are effected by well-known techniques involving electromagnetic transducers, more commonly referred to as "read-write heads". In the case of digital data recording these heads, in the record mode, make a magnetic imprint on the surface of the disc each time an electrical pulse, corresponding to a bit, is impressed upon the head. Because the disc is rotating and the head is stationary at the moment of recording any particular bit, successive bits are recorded along "tracks". A digital recording disc may have on the order of 200 concentric tracks or more, depending on the resolution of the read-write heads. The spacing of these concentric tracks becomes very small as the number of tracks increases. To extract electrical signals from the disc bearing the recorded signals it is necessary to position the head in the read mode exactly over the center of the track which was made by that same head or by a corresponding head during the write mode. Such a track may be only 0.005 in. in width with comparable inter-track spacing, thus requiring a high degree of head positioning accuracy.

Because rapid access to such recorded data is an essential characteristic for any computer system, the location of a recorded track must not only be accurate, but it must be rapid. Computer manufacturers specifiy a maximum time of a few milliseconds for movement from one track to another. Furthermore, the sequence of head shifting from one track to another can be almost continuous, resulting in severe design requirements on the apparatus in the areas of stability, reproducibility, ruggedness and freedom from frequent preventive or corrective maintenance.

The device normally used for effecting the positioning of the read-write heads is a linear motor or linear actuator which operates on the same basic principle as the voice coil in a loudspeaker and is thus commonly referred to as a voice-coil positioner or actuator.

The prior art discloses various methods and means for combining linear actuators with head positioning apparatus in data recorders. For example, U.S. Pat. No. 3,656,015 of Donald E. Gillum discloses a linear motor actuating a read-write head carriage which is guided by means of an upper and a lower rail along which a single grooved upper wheel and a pair of such grooved lower wheels ride during motion of the carriage. Such a suspension system has a very limited bearing surface and, as a result, that bearing surface will wear severely, and stable motion of the head carriage and accurate positioning of it will become difficult. Further, in an attempt to reduce wear, lubrication of the rails may be required. This additional maintenance step and the problems associated with it are eliminated in the present invention. U.S. Pat. No. 3,470,399 of Johnson et al shows a linear-motor-driven positioner utilizing a male dovetail member for carriage guidance. Such a structure is bulky and not usable where compactness is essential in the product. Other patents of interest in connection with linear positioners for magnetic transducers are U.S. Pat. Nos. 3,665,443 of Gillum et al., 3,586,891 of Applequist and 3,521,092 of Kalthoff.

None of the known prior art describes or suggests how to perform the goals achieved by the present invention. The devices of the prior art either are too bulky or too inaccurate to achieve the goals sought and achieved by the present invention.

Accordingly, it is a general object of the present invention to provide improved linear positioner apparatus.

It is a further object of the present invention to provide linear positioner apparatus which achieves maximum stability and accuracy in positioning with maximum compactness in the apparatus.

It is a more specific object of the present invention to provide linear positioner apparatus which is compact, accurate in its positioning in response to control signals, and free from maintenance problems.

SUMMARY OF THE INVENTION

In brief, apparatus in accordance with the present invention includes a mechanism which is mounted on a linear actuator and driven thereby for accurately and reproducibly positioning one or more magnetic transducer heads relative to a record medium. The positioning mechanism includes a carriage movable along an accurately smooth and hardened reference surface on reference guide wheels with the reference guide wheels being urged toward the reference surface by a sloped guide wheel associated with each reference guide wheel, one of those sloped guide wheels being spring-biased to "pre-load" the other sloped and reference guide wheels. Such sloped guide wheels ride along the sloped edges of a pair of parallel guide bars supported by the reference surface and present, in combination with the reference surface, a cross section which can be described as having a female dovetail configuration. Because of the inward slope of the guide bar surfaces, the sloped guide wheels which ride along those surfaces (the upper sloped guide wheel, in one embodiment, being urged against its guide surface by a spring) cause the carriage to assume and maintain a stable position in both the horizontal and vertical directions during both the static and dynamic states of the carriage. Because of the female dovetail configuration to which reference has been made, the bulk of the apparatus for guiding the carriage is significantly reduced without any loss in positioning accuracy.

BRIEF DESCRIPTION OF THE DRAWINGS

A better understanding of the present invention may be had from a consideration of the following detailed description, taken in conjunction with the accompanying drawings in which:

FIG. 2 is front elevation view of the carriage of the positioner of FIG. 1;

FIG. 3 is a right side elevation view, partially in schematic form, showing the suspension arrangement of the positioner of FIG. 1;

FIG. 4 is a front elevation view, partially cut away, of the linear motor assembly of the positioner of FIG. 1; and FIG. 5 is a cross-sectional view taken along the line 5—5 in FIG. 4.

DESCRIPTION OF THE PREFERRED EMBODIMENT

Figure 1:
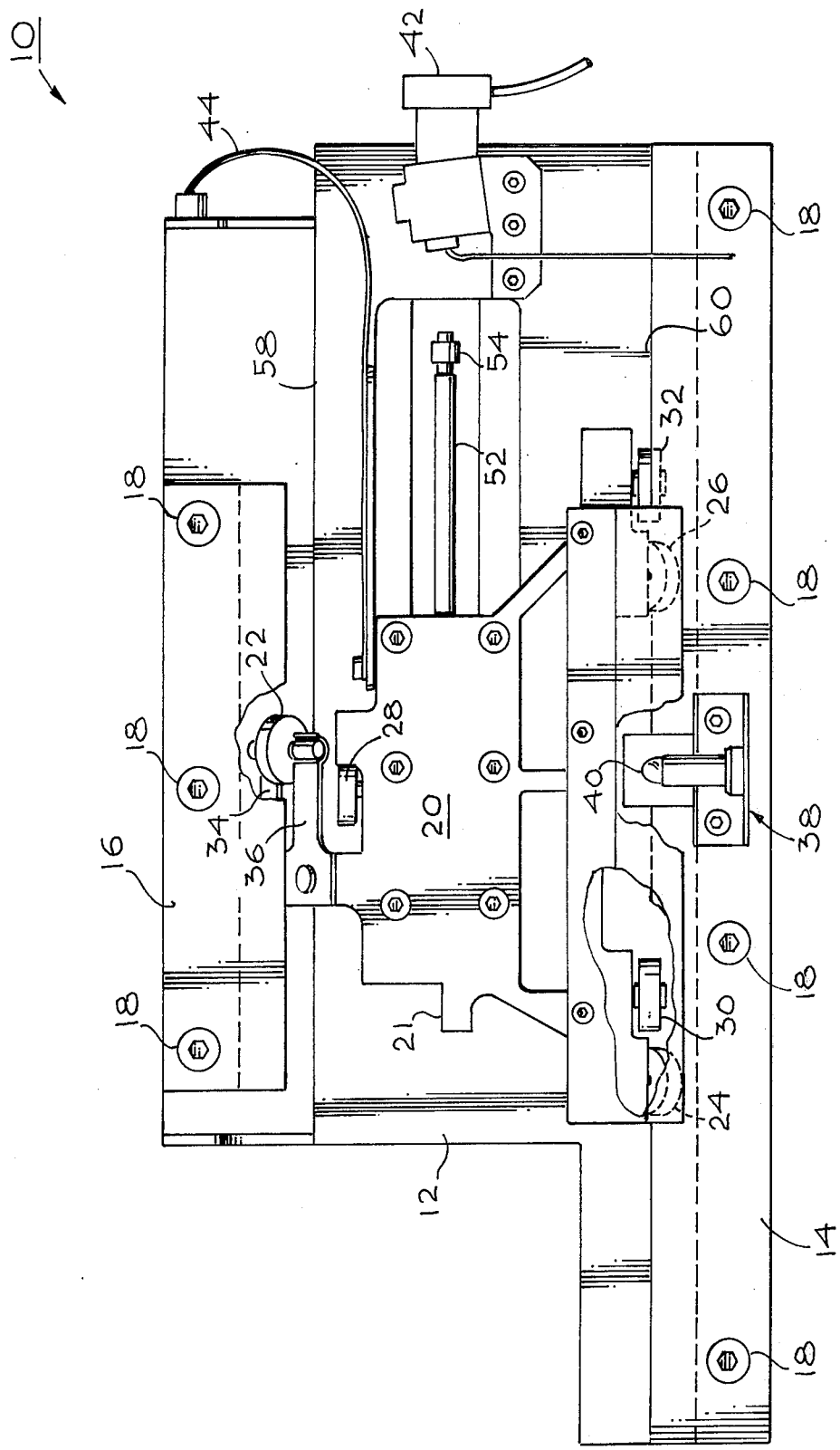
FIG. 1 is a front elevation view, partially cut away, of the transducer positioner according to the present invention.

In the figures, referring particularly to FIG. 1, a positioner 10 is shown having a back portion 12 preferably made of metal, for example aluminum. Whatever material is used must be capable of being finished to a hard surface approaching optical flatness. A lower guide bar 14 and an upper guide bar 16 are supported from the back portion 12 by a plurality of bolts 18. It is imperative that the guide bars 14 and 16 be supported firmly and in closely-parallel relationship with respect to each other. A carriage 20 is adapted to support at its end 21 one or more transducers to be positioned along a transverse horizontal line relative to the view of FIG. 1. The carriage 20 is supported between the guide bars 14 and 16 by means of a spring-biased, angled guide wheel 22 riding on an inner sloped surface of the guide bar 16, as can be seen more clearly in FIG. 3, and an additional pair of angled guide wheels 24 and 26 riding on an internal sloped guide surface of lower guide bar 14, which also can be seen more clearly in FIG. 3. Further guidance of the carriage 20 is achieved by an upper reference guide wheel 28 which moves along an upper portion 58 of a vertical surface of the back portion 12 and a pair of lower reference guide wheels 30 and 32 which ride along a lower portion 60 of the same vertical surface.

A pair of cantilevered springs 34 and 36 mount the axle of the upper angled guide wheel 22 and urge the wheel 22 against the inner sloped shown in FIG. 3, of the upper guide bar 16. The vertical component of the reactive force thus produced urges lower angled guide wheels 24 and 26 into firm contact with the inner sloped surface of the lower guide bar 14.

The provision of a pair of cantilevered springs 34, 36, each resilient relative to the other, for mounting the axle of the wheel 22 advantageously reduces the tolerance requirements imposed on the fabrication and mounting of the guide elements supporting the carriage 20. It is relatively easy to develop the precision flatness of the sloped and reference surfaces and the associated wheels which is needed for improved performance of the present invention. The disposition of the wheels on the carriage 20 and particularly the resilient mounting of the wheel 22 serve to automatically locate the carriage 20 relative to the positioner frame (back portion 12) with the extreme precision which is needed throughout the extent of motion of the carriage 20. This is achieved by virtue of the novel arrangement of the present invention despite the off-center application of the actuating force developed by the voice coil actuator mounted alongside the carriage 20 (rather than in-line therewith) for the sake of compactness. Preferably the sloping guide surfaces are at opposing 45° angles relative to the reference surface and thus are at 90° with respect to each other. The axles of the respective wheels riding along these surfaces, being parallel to their associated support surfaces, are similarly oriented with respect to each other. The resilient springs 34, 36 extend from a single spring plate 35 releasably mounted to the carriage 20, as by screws. This resilient support arrangement permits the carriage to be easily inserted and removed from its operative position along the guide and reference surfaces (ways) without disturbing the precision alignment therein.

A sensor assembly 38 (FIG. 1) including a lamp 40 permits accurate sensing of the position of the carriage 20 and control of that positioning by external circuits, not shown. An assembly 42 permits sensing of the velocity of the carriage 20 as part of the overall control system for the accurate positioning of the carriage 20. A flexible member 44 carries a plurality of electrical conductors which permit the introduction of electrical current to the armature (86 in FIG. 4) of the linear motor which moves the carriage 20.

The details of the carriage 20, while having been set forth in connection with the discussion of FIG. 1, can be seen more clearly in FIG. 2. In FIG. 2, the numerical designations of those elements already identified in FIG. 1 but appearing in FIG. 2 remain the same. From FIG. 2 it can be seen that the lower reference wheels 30 and 32 have their axes in the plane of the carriage 20, as does the upper reference wheel 28. On the other hand, the lower angled guide wheels 24 and 26 have their axes sloped with respect to the plane of the carriage 20. Similarly, the springs 34 and 36, which support the upper angled guide wheel 22 (FIGS. 1 and 3) are supported on a pedestal 46 in such a fashion that the springs 34 and 36 have their flat portions 48 and 50 lying in a plane which is at an angle with the plane of the carriage 20. Center rod 52 is a magnet which is part of the velocity-sensing structure 42 of FIG. 1. A protective collar 54 is mounted near the end of magnet 52. The biasing springs 34 and 36 support the sloped guide wheel 22 in the assembly of FIG. 1.

To further clarify the structure according to this invention by which the firm and stable support and positioning of the carriage 20 and associated transducers may be realized with accuracy, further reference should be made to FIG. 3. From FIG. 3 it can be seen that upper guide bar 16 has an inwardly sloped surface 56 against which the upper angled guide wheel 22 is urged by the springs 34 and 36. The upper reference guide wheel 28 rides on a hardened and flat portion 58 of the back portion 12. If the back portion 12 is made of aluminum, it is first anodized or otherwise surface-oxidized to harden its surface and the region 58 and a corresponding region 60 over which the lower reference guide wheels 30 and 32 ride are lapped to produce very flat and precise reference surfaces.

The springs 34 and 36 urge the upper sloped or angled guide wheel 22 into contact with the inwardly sloping surface 56 and, at the same time, the springs 34 and 36 produce a downward force on the carriage 20 urging the lower sloped or angled guide wheels 24 and 26 on opposite ends of the carriage 20 into firm contact with an inwardly sloped surface 62 on the lower guide member 14. The sloping nature of the surface 62 of the lower guide member 14 translates a portion of the downward force through the carriage 20 into a transverse force which urges the lower reference guide wheels 24 and 32 into firm contact with the lower reference portion 60 on the back portion 12. The cross-sectional configuration formed by the upper guide member 16, the back portion 12 and the lower guide member 14 may be referred to as a female dovetail configuration, and models of this structure which have been built show that stable, smooth and reliable positioning of the carriage 20 can be realized through the use of this suspension structure. The flat edge contact support of the guide wheels against their adjacent flat reference surfaces affords significant improvement with respect to wear as contrasted with the essentially line contact supports of previously known devices for similar purposes.

As has been indicated, the carriage 20 is moved by a linear motor. While the nature and method of operation of linear motors, broadly, is well known, certain features of the linear motor utilized in this invention are novel and, for that reason and to disclose the total positioner structure with the maximum clarity, FIGS. 4 and 5 have been provided. In FIG. 4, a hollow core 70 is shown supported between a pair of end plates 72 held together by screws 74 extending into a rod 73 which is shorter than the distance between the end plates 72. Shims 76 locate the hollow core 70 in its central position. An outer shell 78 is joined to the end plates 72. The core 70, the end plates 72, and the shell 78 are all formed of a material having high magnetic permeability and low magnetic reluctance; for example, a material such as soft iron or low carbon steel. A pair of ceramic magnets 80 and 82 each has the shape of a section of a cylinder and are supported from outer shell 78, as can be seen more clearly in FIG. 5. An air gap 84 is formed between the magnets 80 and 82 and the inner core 70. An armature 86 formed of a plurality of turns of wire is supported centrally in the gap 84 in part by a coupling plate 88 adapted for attachment through threaded bolt receiving holes 87 to carriage 20 of FIG. 1. A pair of leads 90 and 92 are adapted for connection to flexible conductor member 44 (FIG. 1) to conduct electrical current to the armature 86. The ceramic magnets 80 and 82 are polarized radially as shown by a pair of arrows 94 and 96 in FIGS. 4 and 5.

When a voltage is applied to the conductors 90 and 92 in FIG. 4, a current flows in the armature 86 and produces a magnetic field at right angles to the radially-directed flux from the permanent magnets 80 and 82. This develops a force on the armature 86 along the hollow core 70 in a direction determined by the polarity of the voltage applied to the conductors 90 and 92. The effective inductance of the armature 86 is decreased and the rise time of the armature current is reduced by virtue of a thin copper cylinder 98 mounted over the center core 70. This cylinder 98 is shrink fitted on the core, and effectively serves as a compensation winding.

Known prior art magnetic circuits for linear positioners are supposed to be noted for their low flux leakage. While this may be true in the static condition, it is not the case when the armature is energized and the carriage is being moved. Under these dynamic conditions it has been noted that the stray leakage flux is substantial and occasionally erasure of significant portions of the associated disc may occur. This is an unacceptable situation for a device of the type here involved. I have devised an arrangement which eliminates this stray flux problem. The core 70 is hollowed out so that the remaining magnetic material of the core 70 saturates at normal levels of armature drive current. This permits the flux to be limited and contained within the magnetic structure. In addition to alleviating the problem described, I have found other benefits resulting from this structural configuration of the hollow core 70. The current rise time in the armature is shorter, thus accelerating the action of the positioner, and there is an equalization of the force constants with respect to the positive and negative armature currents for extension and retraction of the positioner.

Certain details of the magnetic system of FIG. 4 can be seen more clearly in FIG. 5 in which the ceramic magnets 80 and 82, being shaped as sections of a cylinder, are shown supported from shell 78 by, for example, a layer of epoxy resin 100. The core 70 of high magnetic permeability is spaced from the ceramic permanent magnets 80, 82 by the air gap 84. As has been indicated earlier, the permanent magnets 80 and 82 are magnetized radially as indicated by the arrows 94 and 96 in FIG. 5. The shrink-fitted copper sheath 98 is also shown fitting tightly about inner core 70 in FIG. 5.

By reason of the novel female dovetail suspension structure and the simple spring-biasing arrangement for the transducer carriage of the present invention, the component parts are easy to fabricate, and the positioning apparatus is simple to assemble but after assembly provides highly accurate and stable motion of the carriage. Such stability is highly desirable to achieve the reproducibility of data required in data storage systems for which this apparatus is intended.

Although there has been described hereinbefore a particular embodiment of transducer positioning apparatus in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:
1. Positioning apparatus including:
a carriage;
a back member having a reference surface;
an upper guide member connected to said back member and having a first inwardly sloping guide surface opposite said reference surface;
a lower guide member connected to said back member and having a second inwardly sloping guide surface also opposite said reference surface;
a single upper angled guide wheel spring-mounted on said carriage at an angle thereto in engagement with said first inwardly sloping guide surface;
first and second lower angled guide wheels mounted on said carriage at an angle thereto in engagement with said second inwardly sloping guide surface;
an upper reference guide wheel carried by said carriage in engagement with said reference surface; and
at least one lower reference guide wheel carried by said carriage in engagement with said reference surface.

2. Apparatus according to claim 1 further including spring biasing means mounting said upper guide wheel to said carriage, said spring biasing means being releasably attached to said carriage to permit removal of the carriage from constraint relative to the back member and guide members.

3. Apparatus according to claim 2 in which said spring biasing means is arranged to urge said upper and lower angled guide wheels into contact with said first and second inwardly sloping guide surfaces respectively.

4. Apparatus according to claim 3 in which the spring biasing means, the angled guide wheels and the sloping guide surfaces cooperate to urge the reference guide wheels against the reference surface.

5. Apparatus according to claim 1 in which the angled guide wheels and reference guide wheels are located as adjacent pairs, one of each.

6. Apparatus according to claim 1 in which the upper and lower guide members are aligned parallel to each other and coplanar with the direction of movement of said carriage.

7. Apparatus according to claim 1 in which said upper angled guide wheel has a first axis of rotation which is parallel to said first inwardly sloping guide surface.

8. Apparatus according to claim 7 wherein the carriage is adjustable relative to said first axis by means of a pair of cantilevered springs, each resilient relative to the other, which mount the upper angled guide wheel to the carriage.

9. Apparatus according to claim 1 in which said upper angled guide wheel has a first axis of rotation and said upper reference guide wheel has a second axis of rotation;
said first axis being parallel to first inwardly sloping guide surface;
said second axis being parallel to said reference surface.

10. Apparatus according to claim 1 in which said upper angled guide wheel has a first axis, said upper reference guide wheel has a second axis, said first and second lower angled guide wheels have third and fourth axes, respectively, and said at least one lower reference guide wheel has a fifth axis: said first axis being parallel to said first inwardly sloping surface;
said second and fifth axes being parallel to said reference surface; and
said third and fourth axes being parallel to said second inwardly sloping surface.

11. Apparatus according to claim 10 in which first axis is normal to said third and fourth axes.

12. Apparatus according to claim 1 wherein the guide members and the back member are juxtaposed to form a female dovetail configuration having a longitudinal axis aligned with the direction of movement of the carriage.

13. Apparatus according to claim 1 further including a linear motor coupled to move said carriage in response to the application of operating voltage to said motor.

14. Apparatus according to claim 13 in which said linear motor includes a center core of magnetic material and a sleeve of non-magnetic, electrically-conductive material mounted tightly over the surface of said core.

15. Apparatus according to claim 14 in which said sleeve is made of copper.

16. Apparatus in accordance with claim 14 wherein the center core is hollow to provide flux saturation of the magnetic material thereof in order to eliminate significant flux leakage from the linear motor.

* * * * *